Nov. 22, 1927.
C. W. BROSTEDT
SWIVEL CASTER
Filed Nov. 10, 1926
1,649,946
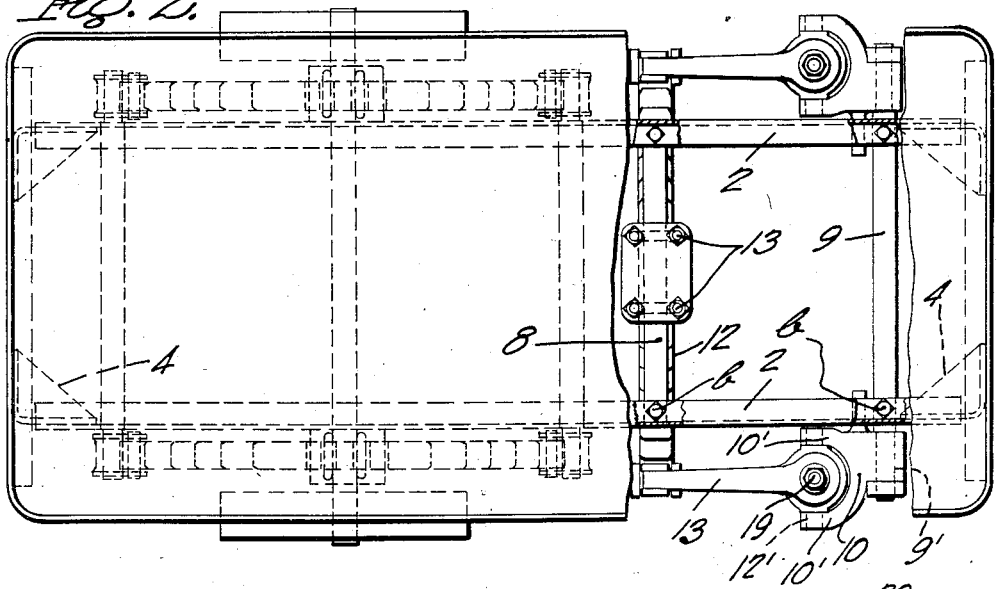
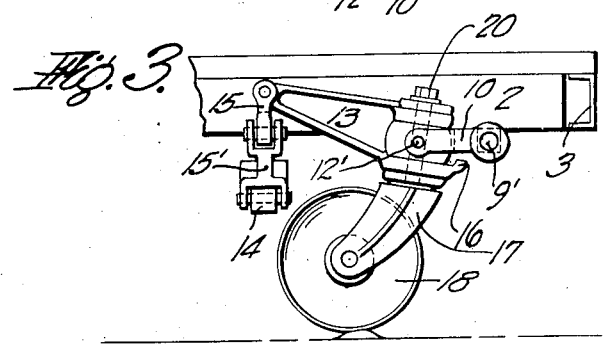
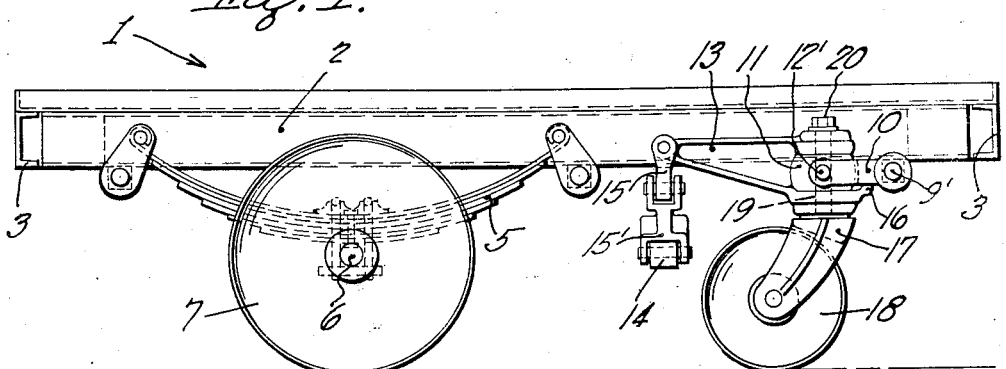
INVENTOR
Carl W. Brostedt
BY Chapin & Neal
his ATTORNEYS.

Patented Nov. 22, 1927.

1,649,946

UNITED STATES PATENT OFFICE.

CARL W. BROSTEDT, OF SPRINGFIELD, MASSACHUSETTS, ASSIGNOR TO THE GEORGE P. CLARK COMPANY, OF WINDSOR LOCKS, CONNECTICUT, A CORPORATION OF CONNECTICUT.

SWIVEL CASTER.

Application filed November 10, 1926. Serial No. 147,573.

This invention relates to improvements in trailers, trucks, or the like, and is directed more particularly to improvements in casters therefor.

Trucks and trailers of the type to which the invention relates, usually include an axle and one or more wheels for supporting one end of the truck and one or more swivel casters for supporting the other end of said truck. The casters commonly employed comprise a swivelled fork member which carries one or more caster wheels and is adapted and arranged so that the caster structure may freely turn on its axis so that the caster wheels will track with the supporting wheels as the truck rounds curves, etc.

These casters of the prior art are intended to support their portion of the load and, being arranged for a swivelling action, they are non-yieldable to such forces as are frequently applied thereto in directions opposed to their pivotal axis. For instance, when the caster wheels strike against an obstruction, the force is transmitted directly against the swivel or pivot which tends to break or bend the pivot so as to impair its pivotal action or otherwise injure or damage the caster.

The principal object of this invention is to provide a swivelled caster which is constructed and arranged to be resiliently connected to the truck for resiliently supporting the same and so as to be yieldable when acted upon by forces applied thereto in directions opposed to the pivotal axis thereof. Its yieldable characteristics provide a cushioning means for absorbing shocks and jolts caused by forces applied thereagainst so that its swivelling features are not injured or impaired thereby. The cushioning is accomplished by means of the novel structure comprising the invention which will now be disclosed in the form at present preferred with reference to the accompanying drawings, in which:—

Fig. 1 is a side elevational view of a truck or trailer having associated therewith a resiliently mounted caster forming a part of the invention;

Fig. 2 is a plan view of the truck shown in Fig. 1; and

Fig. 3 is a side elevational view of the forward end of the truck and caster showing the parts in a different relative position from that shown in Fig. 1.

Referring to the drawings in detail,—a trailer or truck frame 1 is shown that comprises longitudinal side sills 2 and transverse end sills 3 which are suitably secured together by corner gusset plates 4 as shown. A box like body, platform, or any other form of body (not shown) may be secured to and carried by the frame as is usual. One end of the frame is shown as being resiliently supported by springs 5 from an axle 6 which is in turn carried by wheels 7 at either end thereof.

To tie the side sills 2 together, any number or style of cross ties such as struts 8 and 9 may be provided and which are preferably secured to the under side of the side sills 2 by means of bolts $b$ or the like, and while arranged to function as stiffeners for the frame, they are also arranged to cooperate with and support the parts forming the novel features of the invention as will now be described.

A transverse spring 12, preferably of the half elliptic leaf type is secured intermediate its ends to the cross bar 8 by U bolts 13 in the usual manner and is provided at opposite ends with the usual eyes or loops 14 of ordinary form. The cross bar 9 is provided with cylindrical trunnions 9' at the ends thereof which extend beyond the side sills 2, and links 10 oscillatable on said trunnion, are preferably formed to have separated or spaced apart arms 10' which embrace or straddle pivot bearing members 11. These members 11 are pivoted to the ends of said arms by means of pins 12' as shown. Arms 13 extending from and integral with the members 11 are suitably connected at their ends by links 15 and 15' to the eyes or loops 14 of the spring 12. Stops 16 integral with the members 11 are arranged to abut the under side of the links 10 as shown in Fig. 2 for the purpose later to be described.

Swivel members 17, in the form of forks having caster wheels 18 pivoted thereto, have upstanding pivotal spindles or shanks 19 which are rotatable on a vertical axis in the members 11 and are held from displacement therefrom by any suitable means such as a nut 20 in threaded engagement with the upper end thereof. The parts, of course, are so arranged that the forks may rotate freely on the pivots or shanks 19 in order that the wheels 18 may trail or accommodate themselves to the direction of movement of the truck.

With the parts in the relative positions shown in Fig. 1, the frame will, when loaded, be lowered to some extent depending of course, upon the weight of the load and the characteristics of the springs. The rear springs under a load will yield in the usual manner, while the forward transverse spring will be acted upon in the manner now to be described.

As the cross bar 9 with its trunnions 9' is lowered with the frame, the links 10 will be swung downwardly thereby but since the links 10 are in abutment with the stops 16 of the members 11 as shown in Fig. 1 the swinging action of the links will also tend to swing the members 11 so that the wheels 18 thereof will move relative to the frame and along the ground or floor in a rearward direction. The arms 13 of the members will be raised by this swinging movement and, being pivotally connected to the ends of the spring 12, their ability to raise and consequently the freedom with which the frame may lower is dependent upon the resistance of the spring and the relative weight of the load. Thus, the frame at its caster end is resiliently supported by means of the spring 8. As the truck is being moved along an uneven floor or the like, the caster structure in supporting its portion of the load and trailing or tracking the other wheels as is its function, is brought into contact with obstructions as indicated in Fig. 3. As the wheel 18 of the fork brings up against an obstruction, a force is applied to the wheel and fork which tends to swing the same together with the member 11 rearwardly against the action of the spring 8. The spring is preferably adapted to cushion the force of the blow which blow except for the spring structure would be delivered directly to the pivot of the fork in directions opposed to its pivotal axis. In effect, the caster is enabled to yieldingly resist these opposing forces so that the pivot thereof is protected against injury. The fork 18 and member 11 will be swung more or less according to the nature of the obstruction in the path of the wheel and the characteristics of the spring, which spring may be varied to suit various conditions. The connections between the parts may, of course, be varied within wide limits depending upon the type of truck with which the device is used but will preferably be arranged to absorb the blow and to urge the caster wheel towards the ground at all times so that the load is supported resiliently thereby and the caster caused to track accurately upon all conditions of roadway.

While I have shown two such resiliently mounted casters for one end of the truck it will be obvious that the invention may be adapted where it is desired to employ but a single caster or any other desired number for supporting the frame at either or both its ends.

From the foregoing it will be observed that I have provided a novel structure including a swivel caster for a truck or the like and interconnecting means, which are adapted and arranged whereby the frame is resiliently supported by a caster and whereby the caster is resiliently yieldable against forces applied thereto in directions opposed to its pivotal axis.

I am aware that many changes may be made in the form of the invention without departing from the novel features thereof and I prefer therefore, to be limited by the appended claims rather than by the foregoing description of the preferred form of the invention.

What I claim is:

1. The combination with a truck, or the like of a resilient swivel support therefor comprising, a swivel bearing mounted on said truck for a swinging movement in a certain plane, a swivel caster pivoted in said bearing for movements in a plane transversely to said certain plane, a spring interposed between said bearing and said truck for resiliently supporting the bearing and caster against forces applied thereto in directions opposed to said pivotal axis.

2. The combination with a truck or the like of a resilient swivel support therefor comprising, a link pivotally mounted on said truck, a swivel caster pivotally carried by said link, and a spring separated from said link interposed between said caster and said truck for resiliently supporting the caster against forces applied thereto in directions opposed to the pivotal axis thereof.

3. The combination with a truck or the like of a resilient swivel support therefor comprising, a link pivoted on said truck, a swivel caster pivoted thereto, means for limiting a relative movement of said link and caster in one direction, a spring interposed between said caster and truck all adapted and arranged whereby a lowering movement of the truck will move the caster against the action of the spring while an upward movement will permit the spring to urge the caster downwardly.

4. The combination with a truck or the like of a resilient swivel support therefor comprising, swivel casters mounted on pivotal axes transverse to that of their swivel axes and arranged for independent movement thereon, a resilient device between said casters and truck for independently supporting said casters against forces applied thereto in directions opposed to their pivotal axes.

5. The combination with a truck or the like of a resilient swivel support therefor comprising, a link pivoted for movement on said truck in a vertical direction, a swivel bearing pivoted to said link on an axis parallel to the pivot of said link, a fork in said bearing pivoted on an axis transversely to said parallel pivotal axes, an arm integral with said bearing extending therefrom transversely to the pivotal axis of said fork, and a link connected to said arm and frame for supporting said swivel fork and bearing against movements in directions opposed to the pivotal axis of said fork.

6. The combination with a truck or the like of a resilient swivel support therefor comprising, a link having its forward end pivoted to said frame on a horizontal axis, a swivel bearing pivoted to the rear end of said link on an axis parallel to said first named axis, a swivel fork pivoted in said bearing on a vertical axis, means associated with said link and bearing to limit the relative movement thereof, a lever arm integral with said bearing and extending to the rear thereof and a spring interposed between the said arm and frame to support said bearing and fork against movement in directions opposed to the pivotal axis thereof.

In testimony whereof I have affixed my signature.

CARL W. BROSTEDT.